United States Patent [19]

Tuzson

[11] 4,174,724
[45] Nov. 20, 1979

[54] FLOW VALVE

[75] Inventor: John J. Tuzson, Evanston, Ill.

[73] Assignee: Borg-Warner Corporation, Chicago, Ill.

[21] Appl. No.: 814,353

[22] Filed: Jul. 11, 1977

[51] Int. Cl.² .................................. G05D 13/08
[52] U.S. Cl. .................................... 137/56
[58] Field of Search ........................ 137/53, 56

[56] References Cited

U.S. PATENT DOCUMENTS

| 2,406,087 | 8/1946 | Mallory | 137/56 |
| 2,664,906 | 1/1954 | Lautzenhiser | 137/56 |

Primary Examiner—Robert G. Nilson
Attorney, Agent, or Firm—Robert L. Zieg

[57] ABSTRACT

A flow valve mechanism comprising a rotating shaft with a valve body mounted on the shaft for rotation therewith and a valve member mounted for radial movement with respect to said body and said shaft. The valve member has a weighted head and a pressure differential head mounted in a fluid cavity. The pressure differential head divides the cavity into a pair of chambers and an orifice is provided in the pressure differential head communicating with said chambers. A fluid inlet supplies fluid under pressure to one of said chambers, and a fluid outlet is connected to said other chamber whereby the flow of fluid through said orifice and to the outlet will be proportional to the speed of rotation of the shaft.

3 Claims, 1 Drawing Figure

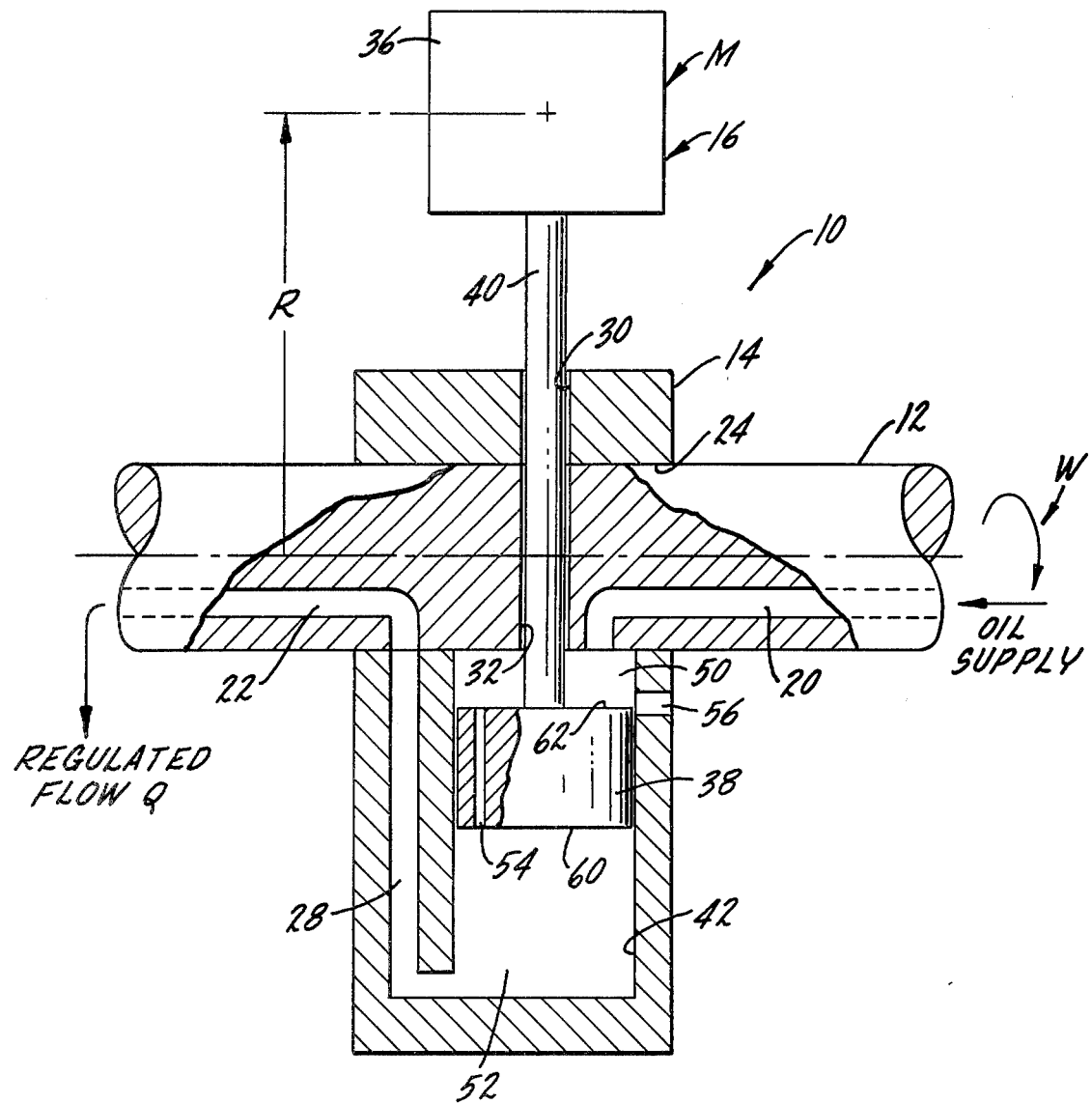

FLOW VALVE

BACKGROUND OF THE INVENTION

In the past, there have been attempts to provide a mechanism which will produce a fluid flow rate which is proportional to the speed of a rotating element. This is most often carried out by a device such as a positive displacement pump, which of course, provides a flow rate directly proportional to the speed of rotation of the pumping elements. Besides being quite expensive, due to the manufacturing difficulties, a positive displacement pump is also inherently a device which consumes a considerable amount of energy and is somewhat inefficient due to leakage losses. Further, the leakage losses reduce the accuracy of the proportional relationship between flow and speed. Further, valve structures are known which can provide a fluid pressure responsive to rotational speed. Further, there are devices known which use a valve mechanism of a somewhat complicated nature to provide a constant flow rate of fluid regardless of shaft speed. However, insofar as has been discovered at this time there are no extremely simple and inexpensive valve devices which can provide an accurate fluid flow rate directly proportional to speed.

SUMMARY OF THE INVENTION

The present invention solves the above enumerated difficulties by providing a simple valve having a valve mounted on a rotating shaft with a valve member having a pressure differential head in a fluid cavity separating the fluid cavity into two chambers and having an orifice therein communicating between said chambers and having a weighted head on the opposite end of the valve member to provide a balanced and simple structure, which will produce a flow proportional to shaft speed.

BRIEF DESCRIPTION OF THE DRAWINGS

The single FIGURE of the drawing shows a cross section through a valve mechanism embodying the principles of the present invention.

DETAILED DESCRIPTION OF THE INVENTION

Referring to the single FIGURE of drawing there is shown a flow valve mechanism 10 comprising a rotating shaft 12 upon which is mounted a valve body 14. The valve body 14 has mounted therewithin a valve member 16.

Shaft 12 has a fluid inlet conduit 20 and a fluid outlet conduit 22. Valve body 14 includes a bore 24 receiving shaft 12, the body 14 being fixed on shaft 12 to rotate therewith. Valve body 14 includes an outlet passage 28 adapted to cooperate with outlet passage 22 of shaft 12. A bore 30 is provided through valve body 14 which aligns with a bore 32 through shaft 12.

Valve member 16 includes an external weighted head 36 and a pressure differential head 38. Heads 36 and 38 are separated by a stem 40, which is received within bores 30 and 32. Head 38 on valve 16 is mounted within a large cavity 42 within valve body 14. Head 38 divides cavity 42 into chambers 50 and 52. Head 38 includes an orifice 54 extending therethrough, interconnecting chambers 50 and 52.

Provided in the side wall of valve body 14 is a vent port 56 which coacts with valve head 38 as will be explained. Valve head 38 further includes a surface area 60 exposed to fluid in chamber 52 and a surface area 62 exposed to fluid in chamber 50. As will be apparent, the area of surface 62 is less than the area of surface 60 because of the space occupied by stem 40 where it meets head 38.

The subject device is operable to provide a flow of fluid at outlet 22 which is directly proportional to the rotational speed of shaft 12. In essence the operation of the device is that oil supplied by conduit 20 is received within chamber 50. Part of the fluid supplied to chamber 50 will be vented through vent port 56 to produce a regulated pressure in chamber 50 at a given time and position of the valve member 16. Part of the regulated flow will also pass through orifice 54 to chamber 52. This flow through orifice 54 will create a pressure drop across the valve head 38. Due to the pressure drop, a pressure difference or "$\Delta P$" will exist across valve head 38, which is proportional to the square of the metered flow "Q" of fluid through the orifice, as illustrated in the formula below wherein "K" is a constant, "$\rho$" is the fluid density and "a" is the orifice area.

$$\Delta P = K\rho(Q^2/a^2)$$

The valve member 16 finds a position radially which is responsive to the speed of shaft 12 and the pressure differential created across head 38, the pressure differential balancing with the centrifugal force which is acting on the head 36. The pressure difference acting on the difference in area between surfaces 60 and 62 balances centrifugal force on head 36 as given by the following formula, wherein "M" equals the mass of head 36, "R" equals the radius from the center of the rotating shaft 12 to the center of gravity of the head 36, "A" equals the cross-sectional area of head 36 exposed to the pressure in chamber 50, and "W" equals the rotational speed of the shaft 12.

$$A\Delta P = MRW^2, \text{ or}$$

$$Ak\rho(Q^2/a^2) = MRW^2, \text{ or}$$

$$Q = a\sqrt{(MR/AK\rho)} \times W$$

From the last above derived formula, it will be seen that the metered flow "Q" which will be supplied through passage 28 and passage 22, is directly proportional to the speed of the shaft 12.

Thus, as described the valve 10 in a very simple manner, provides a regulated flow "Q" which is directly proportional to the speed of the shaft upon which the valve is mounted and will provide a convenient way of obtaining a flow responsive to speed.

Further, in addition to the simplicity of the mechanism described, it will be apparent that the valve 10, may be constructed to be in balance for all rotational speeds by choosing the mass of head 36 such that the mass on both sides of the center of rotation is equal.

I claim:

1. A flow valve comprising a rotating shaft, a valve body mounted on said shaft for rotation therewith, a valve member mounted for radial movement with respect to said body and said shaft, said valve member having a weighted head and a pressure differential head, a fluid cavity in which said pressure differential head is mounted, said pressure differential head dividing said cavity into a pair of chambers, an orifice between said chambers, a fluid inlet supplying fluid under pressure to one of said chambers, and a fluid outlet connected to the other of said chambers, in which said other chamber is radially outward of said one chamber, whereby the flow of fluid through said orifice and to said outlet will be proportional to the speed of rotation of said shaft.

2. A flow valve comprising a shaft rotating about a center axis, a valve body mounted on said shaft for rotation therewith, a valve member mounted for radial movement with respect to said body and said shaft, said valve member having a weight on one side of said center axis and a pressure differential head on the other side of said center axis, a fluid cavity in which said pressure differential head is mounted, said pressure differential head dividing said cavity into a pair of chambers, an orifice between said chambers, a supply of fluid under pressure to one of said chambers, and a fluid outlet connected to said other chamber whereby said weight will move radially responsive to centrifugal force and the flow of fluid to said outlet will be proportional to the speed of rotation of said shaft.

3. A flow valve comprising a shaft rotating about a center axis, a valve body mounted on said shaft for rotation therewith, a valve member mounted for radial movement with respect to said center axis, said valve member having a weighted head on one side of said axis and a pressure differential head on the other side of said axis, a fluid cavity in which said pressure differential head is mounted, said pressure differential head dividing said cavity into a pair of chambers, an orifice between said chambers, a supply of fluid under pressure to one of said chambers, a vent port in a wall of said one chamber to produce a regulated pressure in said one chamber for a given position of said weighted head, and a fluid outlet connected to the other of said chambers, such that said weight will move radially responsive to centrifugal force and the flow of fluid to said outlet will be proportional to the speed of rotation of said shaft.

* * * * *